(12) United States Patent
Meyer

(10) Patent No.: US 8,567,435 B2
(45) Date of Patent: Oct. 29, 2013

(54) CENTRELINE FLOW VALVE

(75) Inventor: Allan Meyer, Cherrybrook (AU)

(73) Assignee: Global Valve Technology Limited, Manly NSW (AU)

( * ) Notice: Subject to any disclaimer, the term of this patent is extended or adjusted under 35 U.S.C. 154(b) by 646 days.

(21) Appl. No.: 12/438,503

(22) PCT Filed: Jun. 14, 2007

(86) PCT No.: PCT/AU2007/000826
§ 371 (c)(1),
(2), (4) Date: Apr. 7, 2009

(87) PCT Pub. No.: WO2008/022367
PCT Pub. Date: Feb. 28, 2008

(65) Prior Publication Data
US 2009/0294715 A1 Dec. 3, 2009

Related U.S. Application Data

(60) Provisional application No. 60/904,125, filed on Feb. 27, 2007.

(30) Foreign Application Priority Data

Aug. 24, 2006 (AU) ................. 2006904581
Oct. 23, 2006 (AU) ................. 2006905856
Dec. 22, 2006 (AU) ................. 2006907157

(51) Int. Cl.
*F16K 15/00* (2006.01)
(52) U.S. Cl.
USPC ............... 137/527; 137/527.2; 137/527.4; 137/527.6; 251/233; 251/243

(58) Field of Classification Search
USPC ................. 137/527–527.6; 251/233, 243
See application file for complete search history.

(56) References Cited

U.S. PATENT DOCUMENTS

| | | | |
|---|---|---|---|
| 996,588 A | 6/1911 | Kennedy | |
| 1,339,791 A * | 5/1920 | Savidge et al. | ................. 82/172 |
| 3,075,547 A * | 1/1963 | Scaramucci | ............. 137/516.29 |
| 3,482,603 A * | 12/1969 | Outcalt | ..................... 137/515.5 |
| 3,822,720 A | 7/1974 | Souza | |
| 3,901,272 A | 8/1975 | Banners et al. | |
| 4,240,630 A | 12/1980 | Hoffman | |

(Continued)

FOREIGN PATENT DOCUMENTS

| | | |
|---|---|---|
| CA | 2635054 | 12/2008 |
| CN | 201099203 Y | 3/2008 |

(Continued)

*Primary Examiner* — Jason J Boeckmann
*Assistant Examiner* — Joel Zhou
(74) *Attorney, Agent, or Firm* — Neal, Gerber & Eisenberg LLP

(57) ABSTRACT

A valve (10) is disclosed. The valve (10) has an inclined valve seat (14) defining a fluid aperture (18), and a valve head (20) for contact with the valve seat (14) for closure of the fluid aperture (18). A lever arm (22) is attached to the valve head (20). There are biasing means (32) operatively coupled to the lever (22) arm for urging the valve head (20) into contact with the valve seat (14), the biasing means (32) being arranged to provide decreased biasing on opening of the valve head (20) relative to the fluid aperture (18).

18 Claims, 15 Drawing Sheets

(56) References Cited

U.S. PATENT DOCUMENTS

| | | | |
|---|---|---|---|
| 4,524,805 A | | 6/1985 | Hoffman |
| 4,569,636 A | * | 2/1986 | Bauer et al. .................... 417/295 |
| 4,706,706 A | * | 11/1987 | Page et al. ................... 137/527.8 |
| 5,746,246 A | * | 5/1998 | Yokota et al. .................. 137/514 |
| 6,050,294 A | | 4/2000 | Makowan |
| 6,089,260 A | | 7/2000 | Jaworski et al. |
| 6,247,489 B1 | * | 6/2001 | Maskell et al. ............ 137/269.5 |
| 7,249,611 B2 | * | 7/2007 | Scaramucci et al. ....... 137/527.2 |
| 2008/0154359 A1 | | 6/2008 | Salgo et al. |
| 2008/0228113 A1 | | 9/2008 | Goldshtein et al. |
| 2008/0237527 A1 | | 10/2008 | Vasquez et al. |
| 2008/0309072 A1 | | 12/2008 | Dole |

FOREIGN PATENT DOCUMENTS

| | | | |
|---|---|---|---|
| CN | 101230563 A | | 7/2008 |
| CN | 101235788 A | | 8/2008 |
| CN | 101240736 A | | 8/2008 |
| CN | 201106514 Y | | 8/2008 |
| CN | 201120950 | | 9/2008 |
| CN | 101275744 | | 10/2008 |
| CN | 201143320 | | 11/2008 |
| CN | 201152239 | | 11/2008 |
| DE | 10 2006 059 967 | | 6/2008 |
| DE | 4033818 | | 5/2009 |
| GB | 811237 | * | 4/1959 |
| GB | 1 301 260 | | 12/1972 |
| GB | 2 448 375 | | 10/2008 |
| JP | 2008-128349 | | 6/2008 |
| JP | 2008-221913 | | 9/2008 |
| JP | 2008-221914 | | 9/2008 |
| JP | 2008-255800 | | 10/2008 |
| RU | 2334866 | | 2/2007 |
| RU | 2339796 | | 3/2007 |
| RU | 2335625 | | 10/2007 |
| RU | 2324638 | | 5/2008 |
| RU | 2326231 | | 6/2008 |
| RU | 2326295 | | 6/2008 |
| RU | 2340797 | | 7/2008 |
| RU | 2331021 | | 8/2008 |
| RU | 2331022 | | 8/2008 |
| RU | 2331023 | | 8/2008 |
| RU | 2339797 | | 11/2008 |
| WO | WO 00/77429 A1 | | 12/2000 |
| WO | WO 03/064903 A1 | | 8/2003 |
| WO | WO 2006/053396 A1 | | 5/2006 |
| WO | 2007/050506 A1 | | 5/2007 |
| WO | WO 2007/098562 A1 | | 9/2007 |
| WO | WO 2007/098563 A1 | | 9/2007 |
| WO | 2008/018023 | | 2/2008 |
| WO | 2008/070232 | | 6/2008 |
| WO | 2008/082356 | | 7/2008 |
| WO | 2008/134311 | | 11/2008 |
| WO | 2009/012365 | | 1/2009 |

\* cited by examiner

CENTRELINE FLOW VALVE

PRIORITY CLAIM

This application claims priority to and the benefit of International Application No. PCT/AU2007/000826, filed on Jun. 14, 2007, which claims priority to and the benefit of: U.S. Provisional Patent Application No. 60/904,125, filed on Feb. 27, 2007; Australian Patent Application No. 2006907157, filed on Dec. 22, 2006; Australian Patent Application No. 2006905856, filed on Oct. 23, 2006; and Australian Patent Application No. 2006904581, filed on Aug. 24, 2006.

FIELD OF THE INVENTION

The present invention relates broadly to a valve and relates particularly, though not exclusively, to a non-return valve, check valve or backflow prevention valve.

BACKGROUND OF THE INVENTION

Check valves of a duckbill configuration are relatively well known and used in the art of valves. The patent literature has a large number of patents disclosing duckbill valves including U.S. Pat. Nos. 3,901,272, 4,524,805, 3,822,720, 4,240,630 and 6,089,260. These patents similarly disclose a valve of a duckbill form having a slit at its outlet. The slit is designed to elastically deform and open when tension is applied about is periphery whereas closure of the slit is automatically provided by biasing stresses in the valve as a consequence of its shape.

The prior art of U.S. Pat. No. 996,588 and German patent no. 4,033,818 describe variants of the duckbill check valves of the preceding art. Both U.S. Pat. No. 996,588 and DE 4,033,818 are valves of a generally conical shape designed to permit flow in a single direction only. U.S. Pat. No. 996,588 is a check valve with a transverse slit through a relatively thick apex portion of the valve which is tensioned under fluid pressure to elastically deform and open. DE 4,033,818 is a pressure relief valve having a discharge aperture at its apex which opens and releases pressure at a predetermined pressure. The valve of DE 4,033,818 is constructed of a highly elastic synthetic resin or rubber which is biased closed but under pressure is stressed about the discharge aperture which is opened.

The applicants (or their predecessors) international patent application no. PCT/AU00/00659 discloses a non-return valve having a valve diaphragm of a conical-shape. The valve diaphragm which is constructed of a resiliently flexible material includes a collapsible aperture which is exposed so as to open under fluid pressure on an upstream side of the valve. The valve diaphragm is tensioned or stressed about the collapsible aperture and the wall thickness of the diaphragm is reduced toward its apex to facilitate this opening of the valve.

These check or non-return valves suffer from at least the following problems:
(i) the differential pressure required across the valve to effect its opening is relatively high;
(ii) the valve may be designed to reduce this differential pressure for opening but then is susceptible to opening and leakage at relatively low differential pressures; and
(iii) the valve in its open condition does not provide great flow throughputs as the throat restriction of the slit or collapsible opening is relatively high.

The applicant's international patent application no. PCT/AU2005/001762 is an example of an attempt to overcome these problems.

SUMMARY OF THE INVENTION

According to the present invention there is provided a valve comprising:
a valve body including an inclined valve seat defining a fluid aperture;
a valve head for contact with the valve seat for closure of the fluid aperture;
a lever arm attached to the valve head; and
biasing means operatively coupled to the lever arm for urging the valve head into contact with the valve seat, said biasing means being arranged to provide decreased biasing on opening of the valve head relative to the fluid aperture.

Preferably the biasing means includes spring means. More preferably the spring means includes a tension spring. Even more preferably the tension spring is elongate having one end attached to the lever arm and an opposite end attached to the valve body.

Preferably the tension spring is pre-tensioned to provide a minimum differential fluid pressure on opening of the valve head. More preferably the spring is configured relative to the lever arm so that the absolute rate of change of the spring elongation decreases on increased opening of the valve head. Still more preferably on opening of the valve an imaginary acute angle made between a longitudinal axis of the spring and a longitudinal axis of the lever arm decreases.

Preferably the lever arm is generally elongate and mounted on a pivot between its opposing ends. More preferably the valve head is attached at or adjacent one end of the lever arm and the spring is attached at or adjacent the other end of the lever arm. Even more preferably the valve head is located on one side of the pivot whereas the spring attachment is on an opposite side of the pivot.

Preferably the valve seat is formed integral with the valve body. More preferably the valve seat is inclined at an angle from 5° to 80° relative to a cross section of the valve body. Even more preferably the angular displacement of the valve head between its closed and opened positions is less than about 75°.

Preferably the fluid aperture is in transverse section shaped oval or elongate for increasing the flow rate through the valve. More preferably the valve head includes a peripheral edge portion which is shaped substantially oval or elongate.

Preferably the valve also comprises a resilient seal fitted adjacent the peripheral edge portion for sealing contact with the valve seat. More preferably the resilient seal is in the form of a lip seal being configured to resiliently deform to promote sealing of the valve head on its closure.

Preferably the valve body defines an inlet fluid passageway on an upstream side of the fluid aperture, said passageway having an internal wall defining a tapered lead-in to the fluid aperture. More preferably the internal wall is adjacent and encloses the pivot of the lever arm. Still more preferably the internal wall on a downstream side of the fluid aperture defines a cavity into which the lever arm is at least in part received on opening of the valve head.

Generally the valve is a non-return or one-way valve of a normally-closed configuration, such as a backflow prevention valve.

Any reference to a valve herein is to be understood as including:
a unit, such as a check unit, which can be used individually or in combination with a plurality of units to form a single check, double check, dual check, reduced pressure zone or other type of value; and a valve comprising one or more units, such as a single, double, dual check or reduced pressure zone valve.

BRIEF DESCRIPTION OF THE FIGURES

In order to achieve a better understanding of the nature of the invention a preferred embodiment of a valve will now be described, by way of example only, with reference to the accompanying figures in which.

DETAILED DESCRIPTION OF THE PREFERRED EMBODIMENTS

Figure 1:
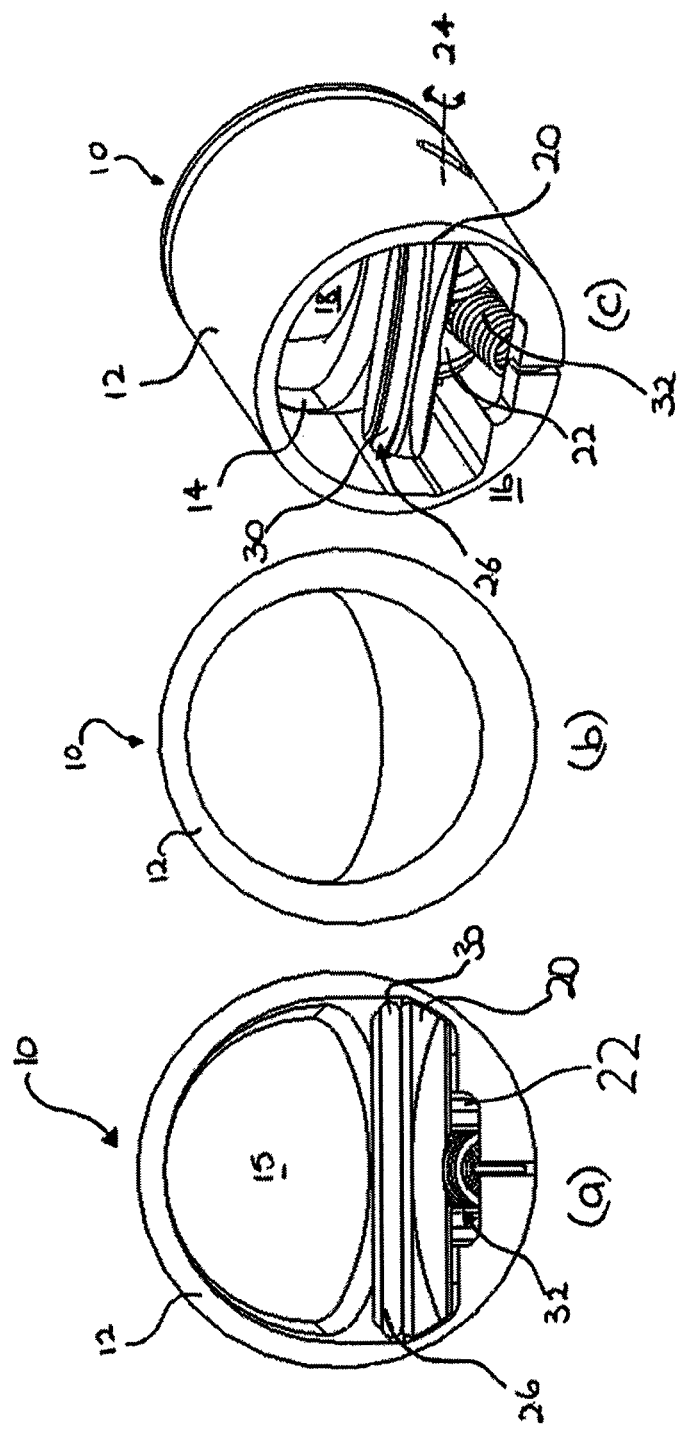
FIGS. 1(a), 1(b) and 1(c) show various views of one embodiment of a valve according to the invention in an open condition.

FIGS. 1(a) to 1(c) illustrate in various views one embodiment of a valve 10 according to the present invention. The valve 10 is typically a water valve for installation in a domestic or industrial water utility flow line. In this application the water valve 10 should in complying with statutory design standards remain closed up to a differential pressure of up to around 7.0 kPa. Whilst the water valve 10 of this embodiment is specifically designed to satisfy this and other design requirements prescribed by various standards, it will be appreciated that the valve may have other applications including but not limited to industrial and domestic check valves, and non-return valves in plumbing installations.

The water valve 10 comprises a valve body 12 which includes a valve seat 14 located within the body 12. The valve body 12 is shaped generally cylindrical with an outlet opening 16 at one end and an inlet opening 18 at an opposite end. In this embodiment the valve seat 14 is formed integral with the valve body 12 which is preferably injection moulded from a thermoplastic or polymeric material such as polyethylene eg HDPE, polypropylene, polycarbonate or nylon. The valve seat 14 defines a fluid aperture 15 within the body 12. It will be understood that FIG. 1(a) is an end view from the outlet 16 of the valve 10 whereas FIG. 1(b) is an end view from the opposite inlet end 18. FIG. 1(c) is a perspective view of the water valve 10 from the outlet end 16 with the valve 10 partially open.

The water valve 10 also comprises a moveable valve head 20 pivotally located within the valve body 12. The valve head 20 is connected to one end of a lever arm 22 which at an opposite end mounts to the body 12 about pivot axis 24 (shown by the imaginary line in FIG. 1(c)). The valve head 20 includes a rebate 26 around its peripheral edge 28 to which a resilient seal 30 is fitted. The resilient seal 30 makes contact with the valve seat 14 for sealed closure of the valve 10. In preferred embodiments, the resilient seal is a closed loop that when placed unstressed on a flat surface naturally takes on the peripheral shape of the valve head 20 which may not circular and may for example be in the shape of an ellipse, distorted triangle, or tear drop.

Figure 2:
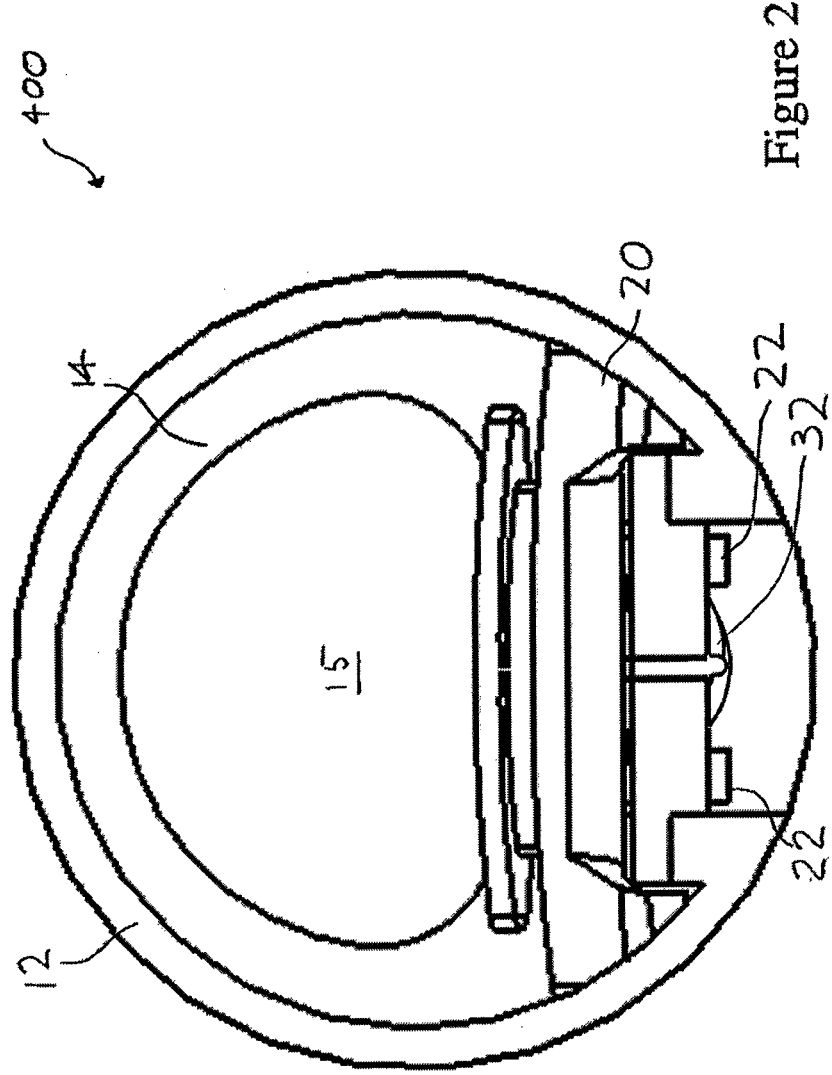
FIG. 2 shows an end on view of another embodiment of a valve according to the invention in an open condition.
Figure 3:
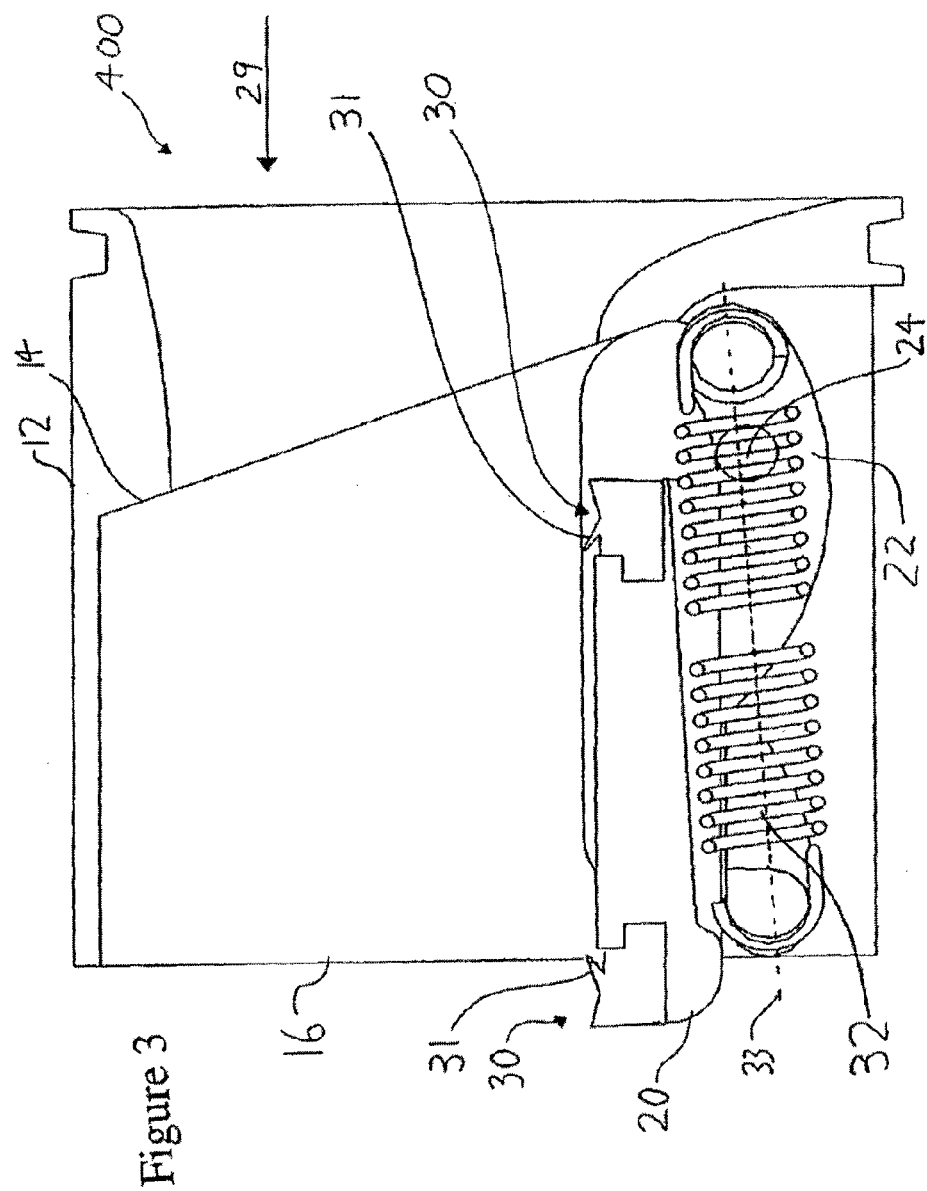
FIG. 3 shows a cross-sectional side view of the valve embodiment shown in FIG. 2.
Figure 4:
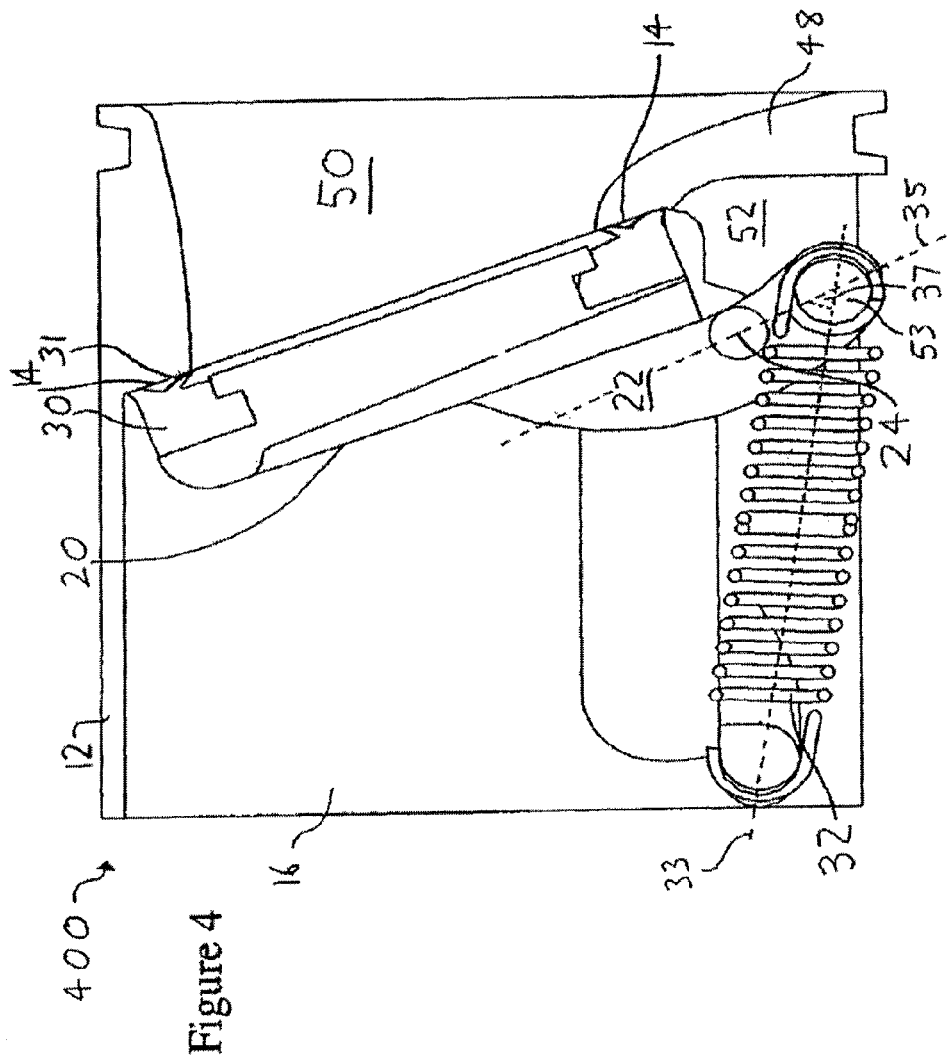
FIG. 4 is a cross-sectional side view of the valve embodiment shown in FIG. 2 in a closed condition.
Figure 5:
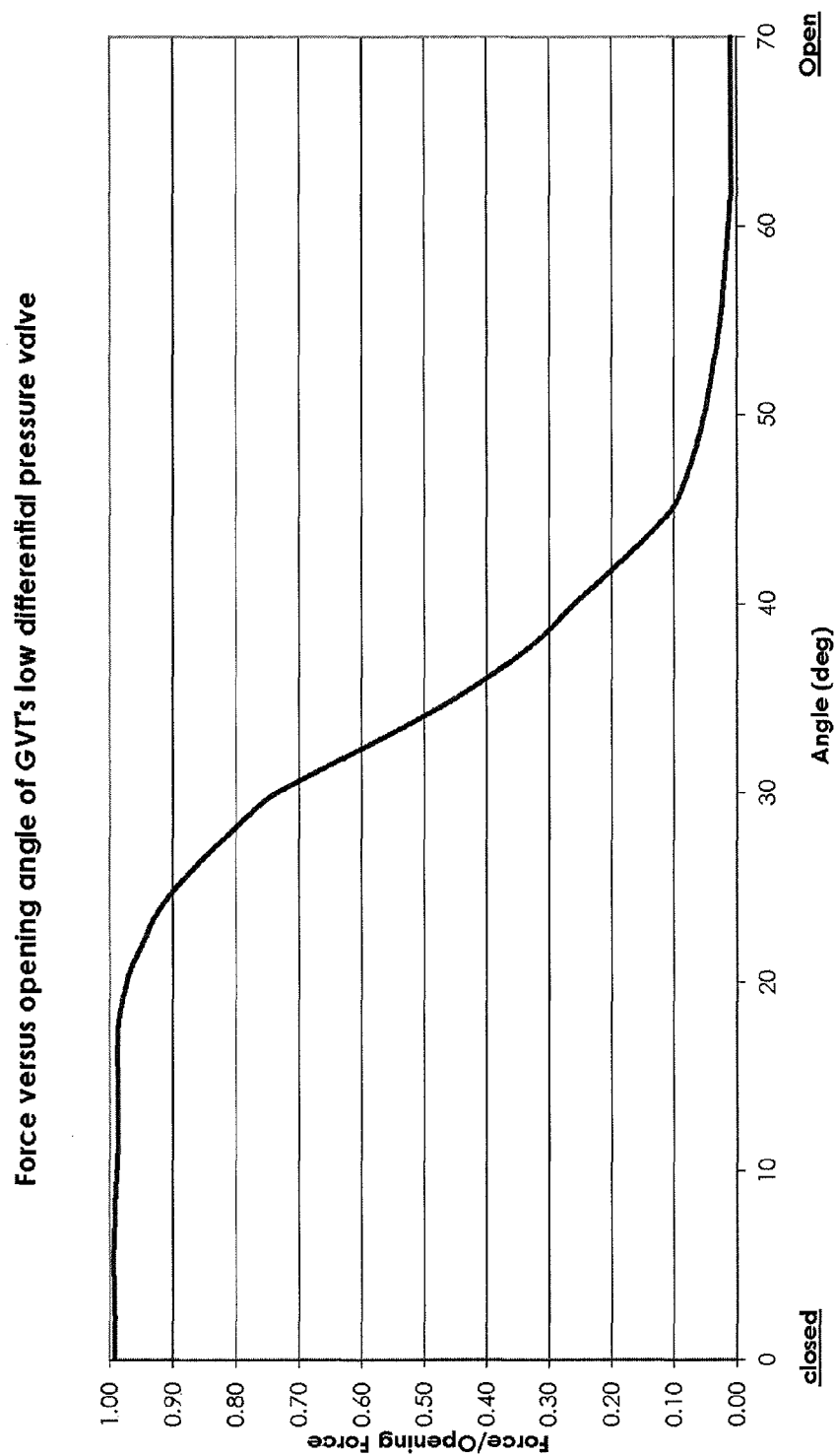
FIG. 5 is an idealised graph of relative force versus opening angle for a valve of FIG. 1.

FIGS. 2 to 4 illustrate, in various views, another embodiment of a valve 400 according to the present invention. Components similar to corresponding components in the previous embodiment are identically numbered. For enhanced sealing, the resilient seal 30 shown in FIG. 3 includes a protruding lip 31 such as that disclosed in the applicant's international patent application No. PCT/AU2007/000263. The contents of this earlier-filed patent application together with the applicant's priority applications i) Australian provisional application No. 2006901049, and ii) US provisional application No, 60/816,885 are to be considered disclosed herein by way of reference. Furthermore, the valve seat 14 is preferably "square" whereby the seal 30 contacts a flat surface rather than an angular surface. In some embodiments the resilient seal 30 and the valve seat 14 are exchanged, that is the seal is fitted to the valve seat. The seal 30 may be a simple seal such as a compression or O-ring type seal.

The water valve 400 of this embodiment also comprises biasing means in the form of a tension spring 32. The tension spring 32 is elongate and connected at opposite ends to the valve body 12 adjacent the outlet end 16 and the opposite end of the lever 22, respectively.

Figure 6:
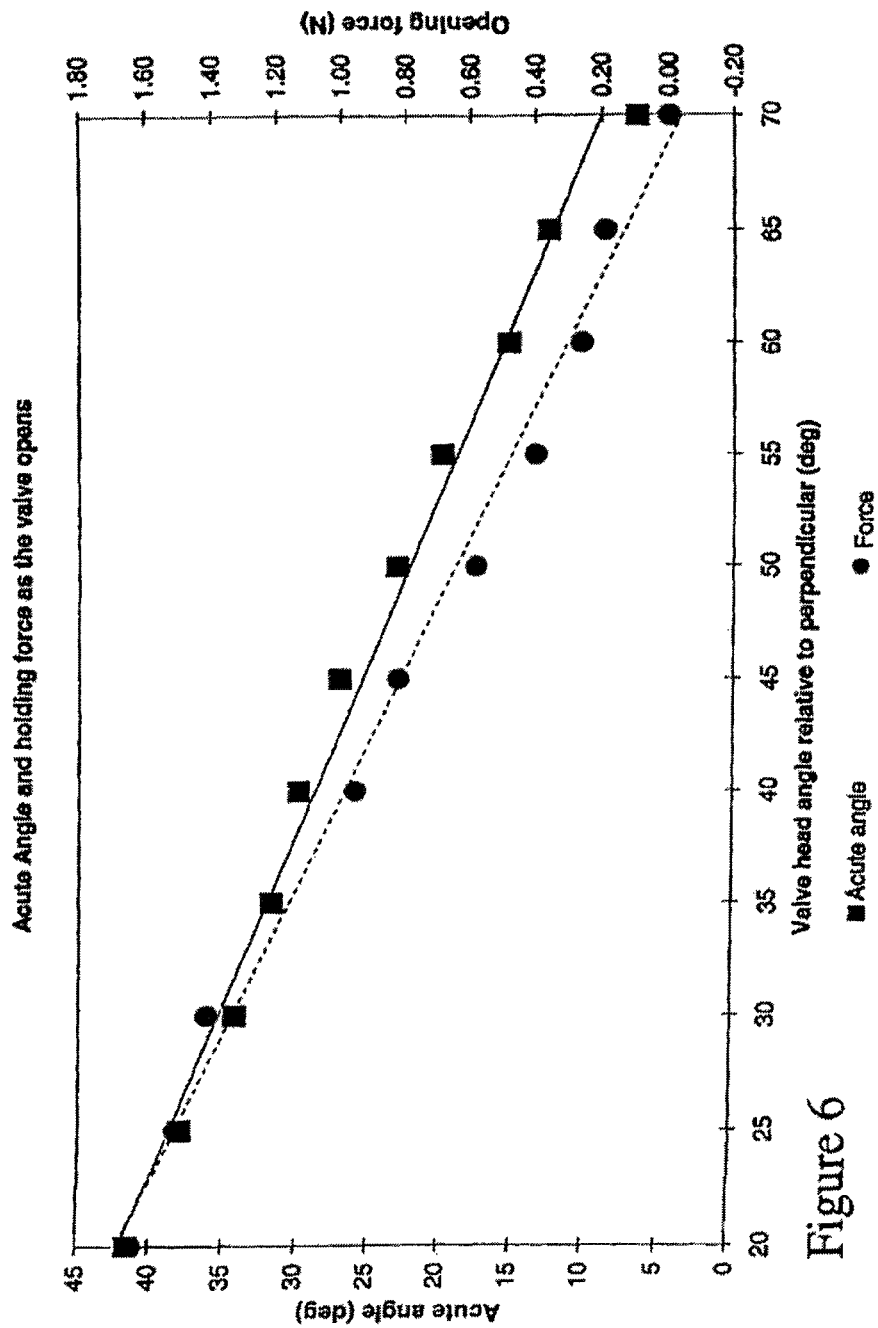
FIG. 6 is a graph of the measured spring force and acute angle versus opening angle for the valve embodiment shown in FIGS. 2 to 4.
Figure 7:
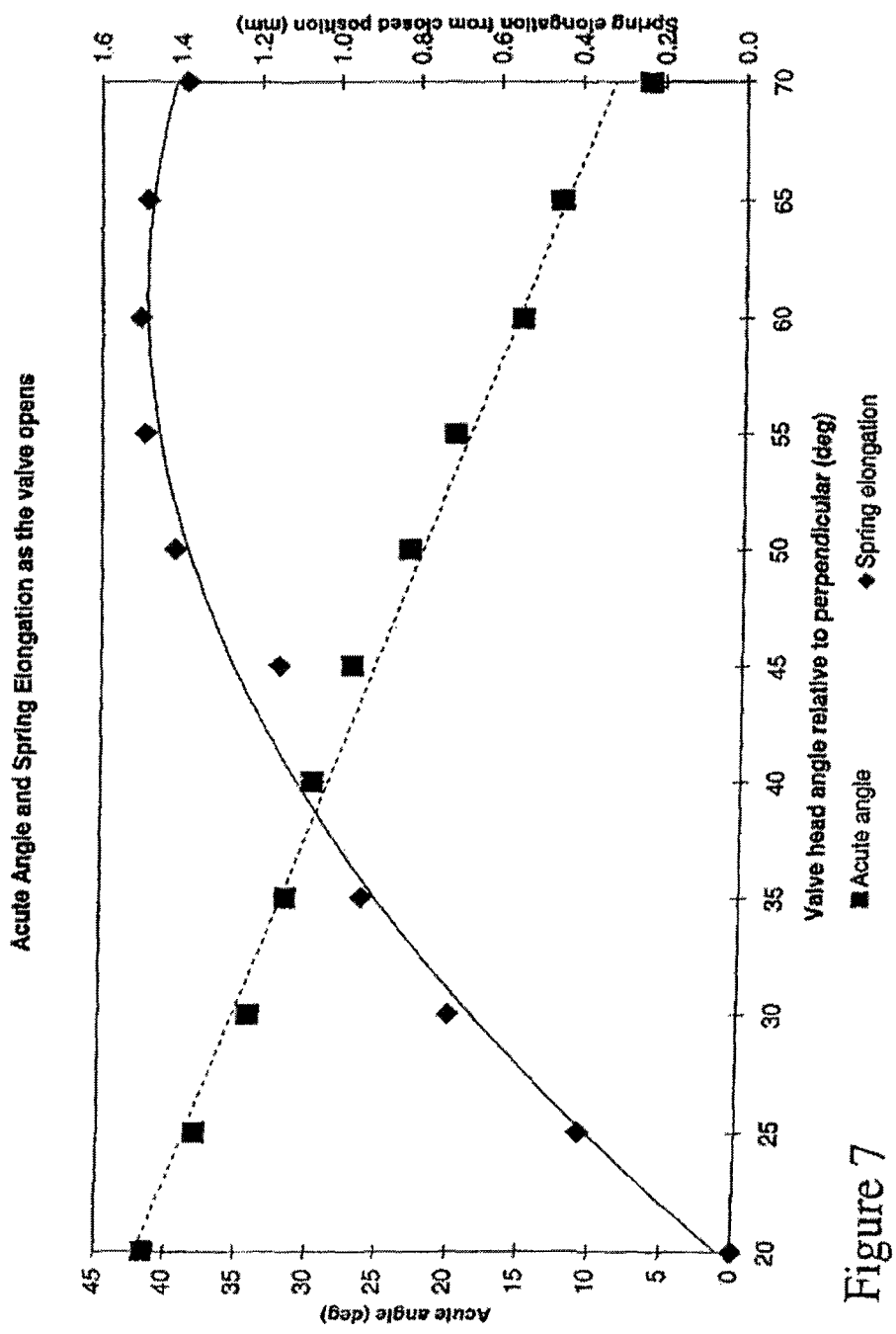
FIG. 7 is a graph of the spring elongation and the acute angle versus opening angle for the valve embodiment shown in FIGS. 2 to 4

The spring 32 is configured relative to the pivot axis 24 and its connection to the lever arm 22 to control the force required to open the valve 400. This is exemplified by the graph of FIG. 6 where the force, directed in the flow direction 29, required to open the valve 400, that is the opening force, progressively reduces as the valve opens (the lines in FIGS. 6 and 7 are only to guide the eye). It will be appreciated that this reduction in opening force is provided by the reduced biasing effect the tension spring 32 has on opening of the valve head 20. For example, the force required to open the valve head 20 when it is essentially half opened (at about 45°) is only 50 percent of that required to initially open the valve head (at 20 degrees). This design provides effective closure at low differential pressures, for example up to around 7.0 kPa, whilst providing minimal resistance to opening for the majority of the angular movement of the valve head 20. The force required to keep the valve fully open (at 70 degrees) is a small fraction of the force required to initially open the valve.

The force required to hold the valve head 20 in an open position is balanced by the torque applied to the lever 22 by the spring 32. The net torque is dependent on:

1. the tension in the spring 32 resulting in a force applied to the lever arm 22 directed along the spring axis 33; and
2. the component of this force tangential to an arc swept out by the end of the lever arm 22.

Item 2 is related to the sine of the imaginary acute angle 37, as shown in FIG. 4, made between a longitudinal axis of the spring 33 and a longitudinal axis 35 of the lever arm 22. This angle 37 is at a maximum when the valve 400 is closed and decreases as the valve 400 is opened as shown in FIG. 6. As shown in FIG. 6, when valve 400 is fully open the angle 37 is close to zero and item 2 is minimal, thus the force required to hold the valve 400 fully open is less than the force required to hold the valve closed. The data points shown in FIGS. 6 and 7 have an associated error of between 10 and 20 percent.

As best shown in FIG. 3 the valve head 20 is offset relative to the longitudinal axis 35 of the lever arm 22. This allows the valve 400 to fully open without the valve head 20 contacting the spring 32 which would otherwise restrict how far the valve 400 can be opened restricting the flow. A non offset valve head would also increase the acute angle 37 of the fully open valve 400. Because the force to hold the valve 400 open approaches zero as the acute angle 37 approaches zero, having a valve 400 that can fully open, by way of a valve head offset for example, is advantageous.

The decreasing torque resulting from the reduction in the acute angle 37 as the valve 400 opens is in part opposed by the increasing elongation and thus tensioning of the spring 32. In this embodiment, the valve seat 14 defines a plane inclined at an angle relative to a transverse or cross-sectional plane of the valve 400. That is, the valve seat 14 is inclined at an acute angle relative to a central longitudinal axis of the valve 400. In this case and as best shown in FIG. 4:
1. the angle swept out by the rod 53 to which the spring is attached on fully opening of the valve is reduced; and
2. the initial rate of spring elongation is reduced, in turn reducing the final spring elongation.

FIG. 7 shows that the rate of spring elongation is greatest when the angle between the valve head and a cross-sectional plane of the valve is small. The preferred embodiment, in which the closed valve head 26 is inclined 20°, avoids the (omitted) region of the curve from 0° to 20°. This reduces the final spring elongation, and thus opening force, when the valve 400 is fully opened. The graph of FIG. 7 also shows that the angle swept out by the valve head 26, and thus the rod 53, is at most 50 degrees, further reducing the spring elongation, and thus the opening force, when the valve 400 is fully opened.

Using a spring with a small spring constant is also beneficial as in this case the rate of change of the spring force with an increasing spring elongation is reduced. Also, having the spring 32 attached to the lever arm 22 close to the pivot 24 results in less spring elongation compared to the case where the spring 32 is attached to the lever arm 22 far from the pivot 24.

The opening characteristics of the valve 10 can be modified by the following factors including:
1. Changing the physical design of the valve, for example, re-angling the valve seat;
2. "Adjusting" the biasing force of the spring 32 or other biasing means;
3. Moving the connection of the spring 32 toward or away from the pivot 24 so as to decrease or increase, respectively the lever arm effect;
4. Moving either or both of the mounting points of the spring relative to the pivot axis 24 to reduce or increase the force applied to the valve head 20; and
5. Moving the pivot 24 relative to the spring 32 to similarly adjust the effective forces applied to the valve head 20 through its full stroke.

Figure 8:
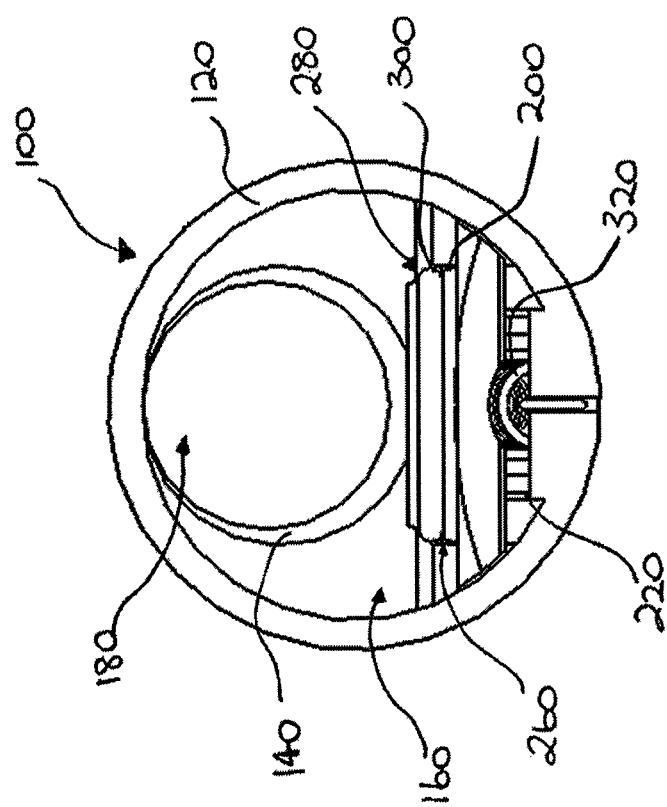
FIG. 8 is an end view of an alternate valve of the invention.

FIG. 8 is an end view of an alternate embodiment of the valve. For all intents and purposes this alternate water valve 100 is the same as the previous embodiment except for the shape of the valve seat 140 and valve head 200. For ease of reference we have designated corresponding components of this valve 100 with an additional "0" for example the valve body is designated as 120. The valve seat 140 of this example is generally circular and shaped complementary to the valve head 200. It will be apparent from comparison of FIG. 1(b) and FIG. 8 that the alternate valve 100 has a greater throat restriction as compared to the previous valve 10 and relatively speaking is likely to have reduced flow through put capacity.

Figure 9:
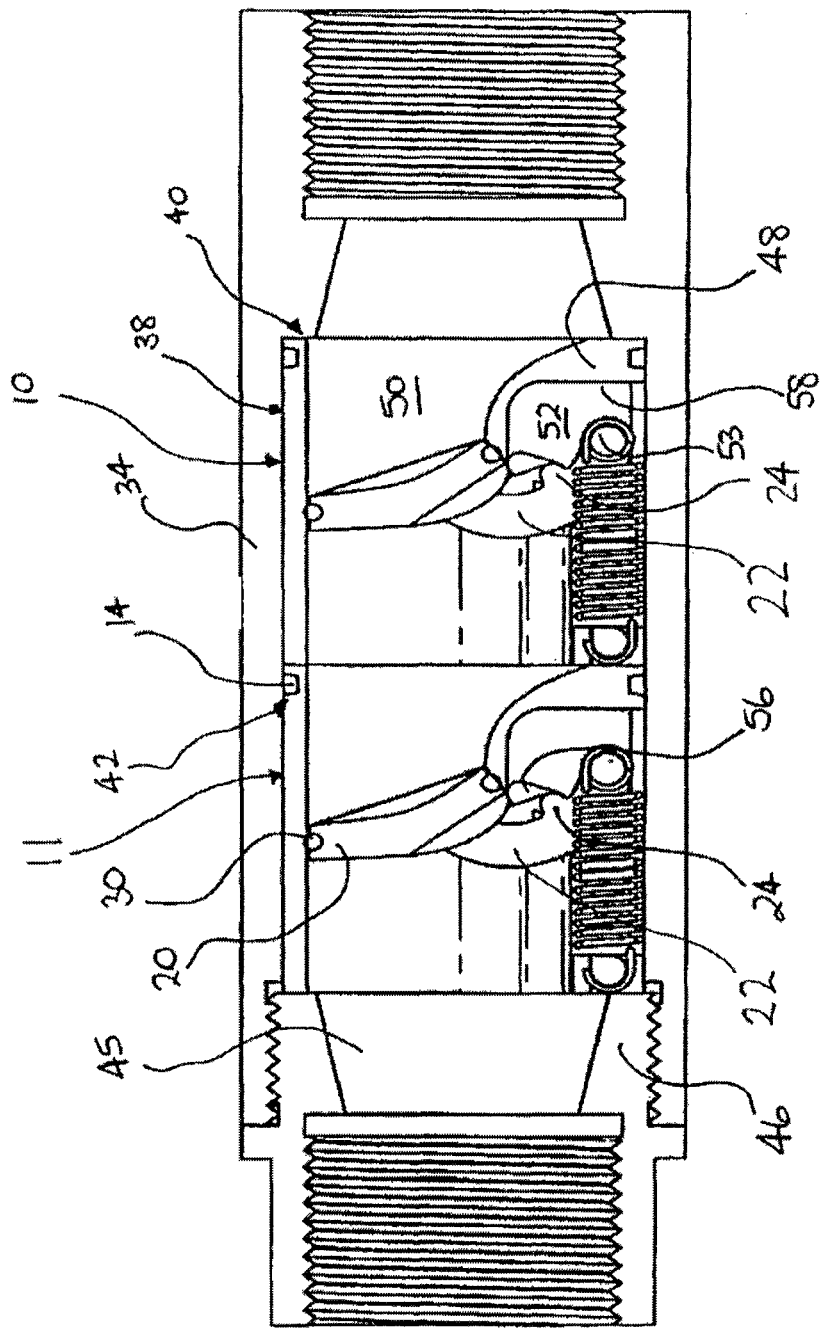
FIGS. 9 and 10 are longitudinal sectional views of two of the valves of FIG. 1 installed in tandem in a flow line in the closed and open conditions, respectively.
Figure 10:
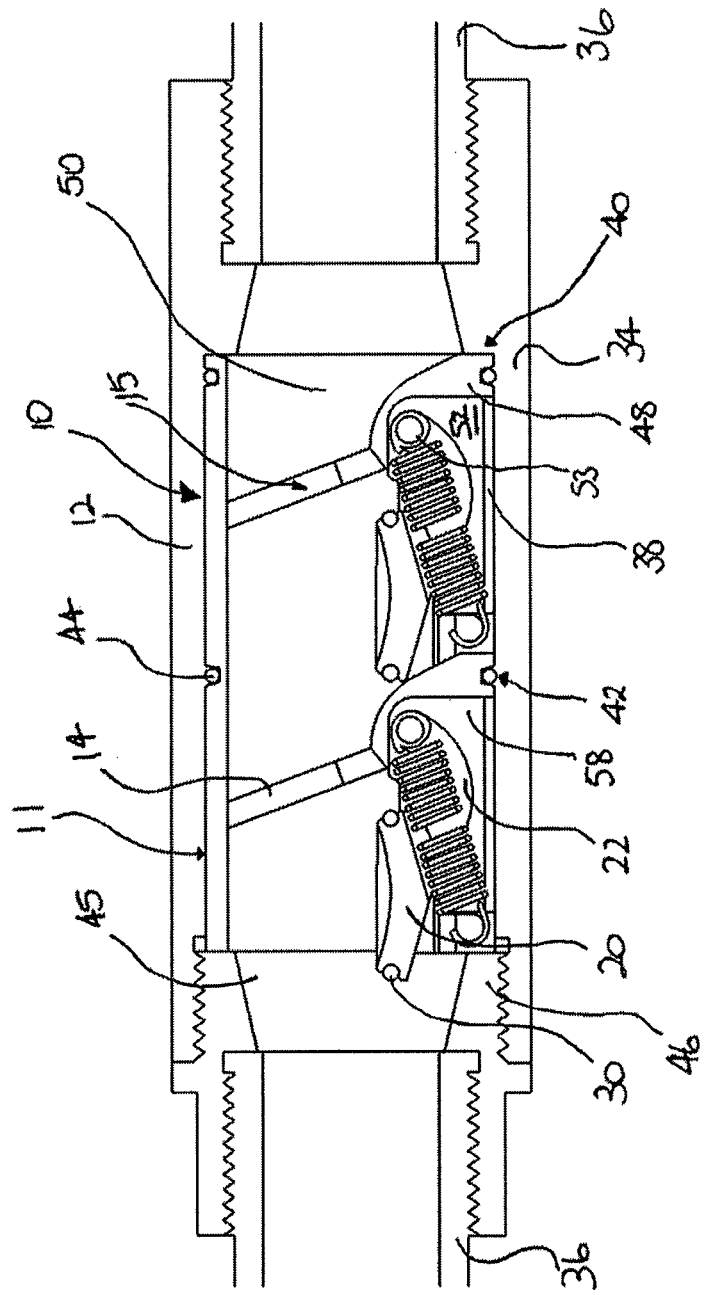

FIGS. 9 and 10 show the valve of FIG. 1 installed in tandem in flow casing 34 (a dual check arrangement) of flow line 36. FIG. 9 shows the valves 10, 11 in their closed condition whereas FIG. 10, 11 shows the valves 10 opened. To avoid repetition we have designated components once for either of the valves 10, 11. The casing 34 has an internal bore which permits press fitting of the valves 10 which abut and are co-axially align with one another. The bore 38 at an upstream flow end includes a shoulder 40 for the upstream valve 10 and the bore tapers inwardly to align with the upstream flow line 36. Each of the valves 10, 11 at an upstream end includes an annular recess 42 which retains an O-ring seal 44 for sealing the valve body 12 within the casing 34. The casing 34 includes an enlarged threaded opening 45 at a downstream end of the casing 34. The valves 10, 11 are "loaded" into the bore 38 via this enlarged opening 45. The valves 10, 11 are then secured within the casing 34 via screw threaded fitting 46 which attaches to the downstream end of the casing 34.

FIGS. 9 and 10 also clearly depict the valve body 12 having an internal wall 48 which houses the majority of the lever arm 22, the pivot 24 and the spring 32. The internal wall 48 on an upstream side of the valve 10 defines a tapered lead-in 50 to the fluid aperture 15. The internal wall 48 defines a cavity 52 on its downstream side into which the lever arm 22 is at least in part received on opening of the valve head 20.

As best shown in FIGS. 1 and 8 the lever arm 22 is in fact one of a pair of laterally spaced apart arms connected to a rear side of the valve head 20 and having a common pivot 24. The arms 22 are interconnected at there opposite end via the rod 53. The rod 53 provides a mounting point for the tension spring 32 which lies between the pair of lever arms 22.

As best shown in FIG. 9, the lever arms 22 each include a bearing element 54 which protrudes from their upper arcuate surface. The bearing elements 54 together define the pivot axis 24. In this embodiment the bearing element 54 engages a bearing recess 56 during opening and closing of the valve head 20. The bearing recess 56 is included in each of a pair of spaced apart longitudinal walls such as 58 which underlie and are connected to the internal wall 48.

It will also be apparent from FIGS. 9 and 10 that the valve seat 14 defines a plane inclined at an angle relative to a cross-sectional plane of the valve 10. In this embodiment the valve seat 14 and the valve head 20 in its closed condition are inclined at an angle of about 15°. This inclination of the valve seat 14 together with the shape of the internal wall 48 means that the fluid aperture 15 is generally oval or elongate in shape. On the other hand, the fluid aperture 150 of the alternate embodiment of FIG. 8 is shaped substantially circular where the valve seat 140 is effectively inclined relative to a cross-sectional plane of the valve 100. By inclining the valve seat 14 the effective throat of the fluid aperture 15 is increased. The valve head 20 may also be shaped so that on opening of the valve it generally conforms with the internal shape of the valve body, and the valve seat or fluid aperture is shaped to provide adequate seating of the valve head on closure of the valve. For example, the valve head may be shaped in the form of a saddle.

Figure 11:
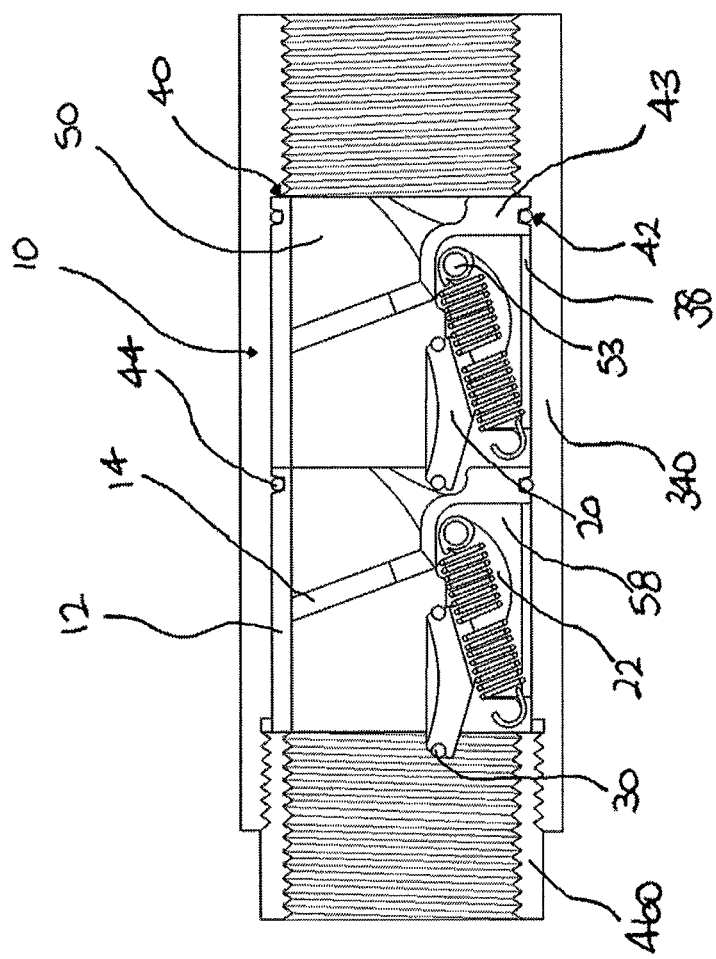
FIG. 11 is an alternate installation of the valve housed in tandem.

FIG. 11 is a sectional view of an alternate installation for a domestic or industrial water utility. The casing 340 of this example is somewhat different to the previous application but otherwise the bank of two valves is effectively the same. Therefore, in order to avoid repetition we have designated the corresponding components of this application with the same reference numerals as the previous embodiment.

Figure 12:
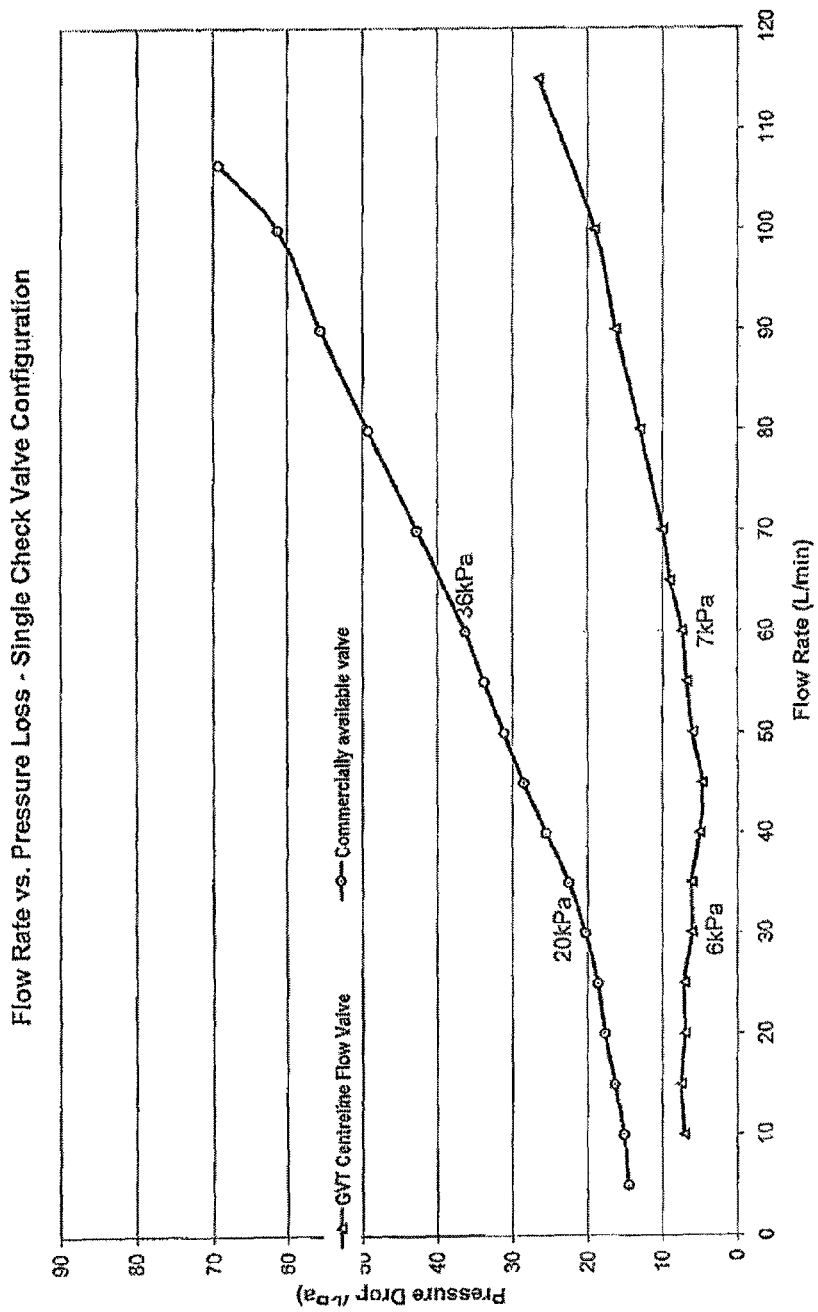
FIG. 12 is a graph of pressure drop versus flowrate for the valve of FIG. 1 and a commercially available valve, measured as the flow rate is increased from zero L/min.

FIG. 12 is a graph of pressure drop versus flowrate for the embodiment of the valve shown in FIG. 1. The pressure drop varies approximately from 5 to 10 kPa for flow rates less than approximately 65 L/min. For comparison, similar results for a commercially available valve are shown. The pressure drop varies approximately from 15 to 40 kPa for flow rates less than approximately 65 L/min. The pressure drop of the valve of FIG. 1 is less than approximately 25% the pressure drop of the commercially available valve over this range, and is many times smaller than the standard pressure drop of 50 kPa at 48 L/min. At flow rates of 20 L/min, 40 L/min and 60 L/min the lever 22 sweeps out 25%, 50% and 100% respectively of its angular range.

Figure 13:
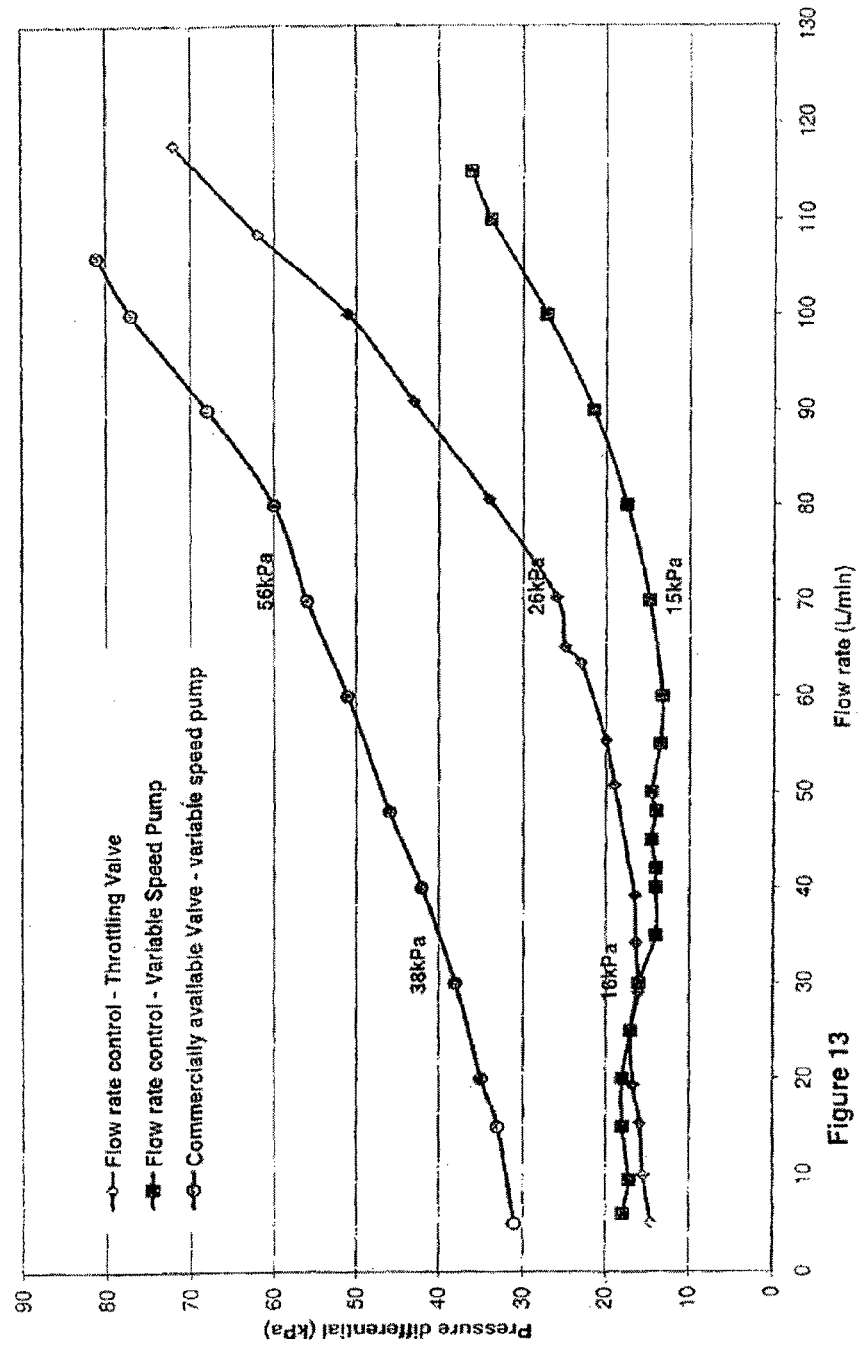
FIG. 13 is a graph of pressure drop versus flow rate through two abutted valves of FIG. 1 (a dual check arrangement) measured using both throttling valve and variable speed pump flow rate control, and also for a commercially available valve, the measurements being taken as the flow rate is increased from zero L/min.

FIG. 13 is a graph of similar measurements as those in FIG. 12, but for two abutted valves in a dual check arrangement, such as shown in FIG. 9. The measurements were performed twice. The first set of measurements were taken using a throttling valve and the second set of measurements were taken using a variable speed pump to govern flow rates. For comparison, measurements were taken for a commercially available valve using the variable speed pump to govern flow rates. The lever arm 22 of the upstream valve 10 sweeps out 50%, 100% and 100% of its angular range at flow rates of 30 L/min, 45 L/min and 55 L/min respectively. The lever arm 22 of the down stream valve 11 sweeps out 50%, 75% and 100% of its angular range at flow rates of 30 L/min, 45 L/min and 55 L/min respectively.

Figure 14:
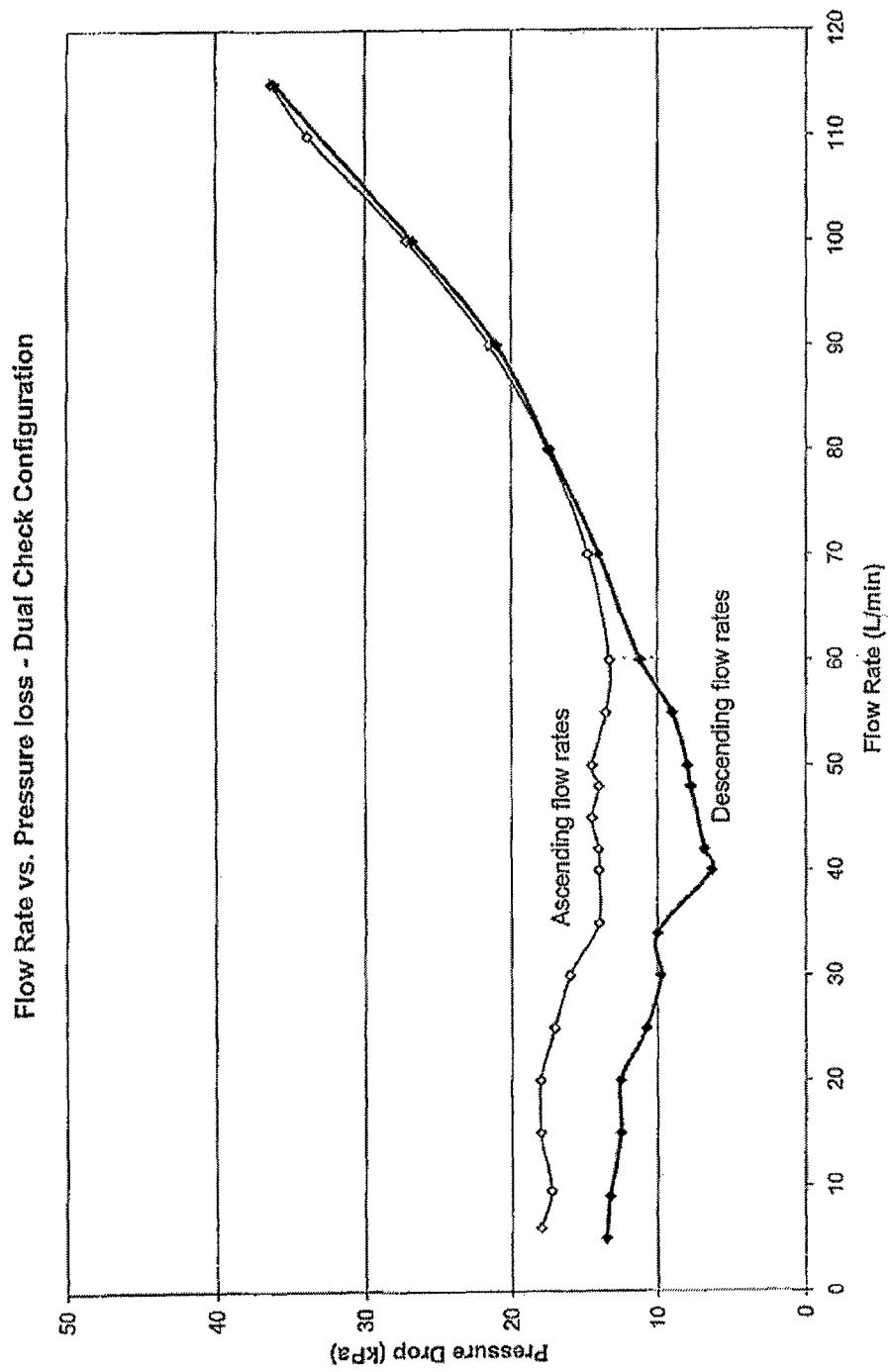
FIG. 14 is a graph of a pressure drop versus flow rate through two abutted valves of FIG. 1 measured as the flow rate is increased from zero L/min and measured again as the flow rate is decreased.

FIG. 14 is a graph of pressure drop versus flow rate for two abutted valves of FIG. 1 in a dual check configuration, measured both as the flow rate is increased and then decreased. Hysteresis is observed; the lowest pressure loss is measured as the flow rate is decreased. The hysteresis can be controlled by altering manufacturing tolerances and the nonlinear spring arrangement.

Figure 15:
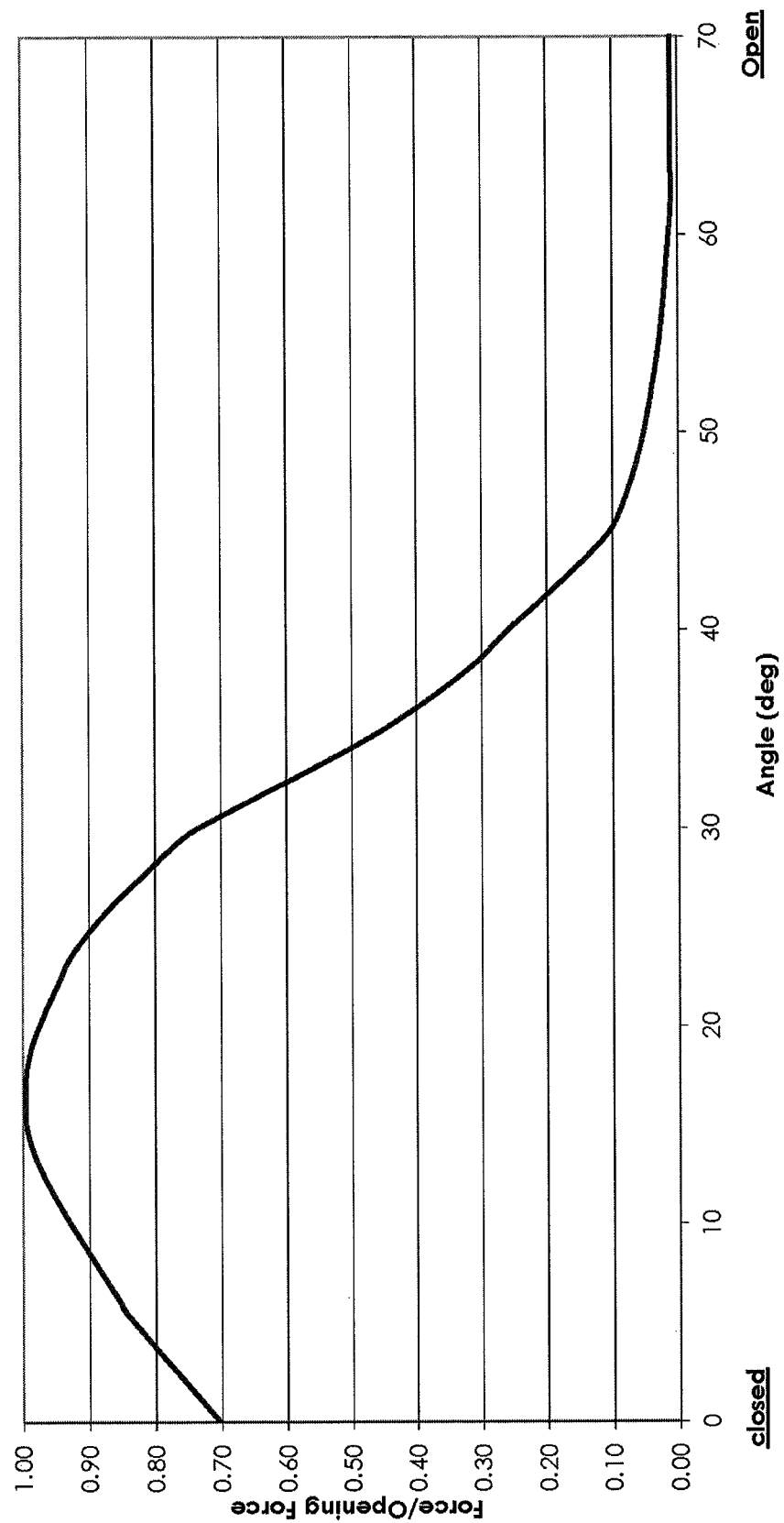
FIG. 15 is an alternate idealised graph of relative force versus opening angle.

FIG. 15 is a graph of opening force versus valve head angle for another embodiment of the invention. In this case it should be noted that although the force initially increases it then reduces from around 15% opening and at full opening the force is 70% less than that required to initially open the valve.

Now that several preferred embodiments have been described in some detail it will be apparent to those skilled in the art that the valve has at least the following advantages:
1. The valve can be designed to remain closed and thus avoid leakage up to a minimum differential pressure, typically less than 5 to 10 kPa, when it opens;
2. The valve can be manufactured and fabricated to operate with consistent characteristics, for example opening at a predetermined minimum differential pressure;
3. The valve provides relatively high back flow resistance;
4. The valve and valve head can be designed to provide a relatively large throughput opening and thus flow capacity;
5. The fluid pressure drop through the valve is significantly less than prior art valves (that is, an improved flow coefficient $C_v$ or flow factor $K_v$), and consequently:
   (i) supply pressure can be reduced allowing the use of smaller and more efficient supply pumps or the reduction in water tower elevation in buildings and areas in which the present invention is extensively deployed, or
   (ii) smaller valves having less material than the prior art valves, but with the same or similar pressure loss, can be used which is economically advantageous.

Those skilled in the art will appreciated that the invention described herein is susceptible to variations and modifications other than those specifically described. For example, the valve can be cast or moulded from metal or plastic and may be of a composite construction where components such as the seal may be elastomeric and other components plastic or metallic. The valve need not be limited to the tension spring embodiment described but may extend to other springs or biasing means provided the biasing force reduces on opening of a valve. The valve head need not be planar as described and shown. For example, the valve head may be curved in a 3-dimensional form and may be shaped in the form of a tongue or saddle. All such variations and modifications are to be considered within the ambit of the present invention the nature of which is to be determined from the foregoing description.

It is to be understood that any acknowledgement of prior art in this specification is not to be taken as an admission that this acknowledge prior art forms part of the common general knowledge in Australia or elsewhere.

The invention claimed is:
1. A valve comprising:
   a valve body including a valve seat defining a fluid aperture and inclined at an angle from 5 to 35 degrees relative to a cross section of the valve body taken at 90 degrees relative to a fluid flow axis through the valve body;
   a valve head for contact with the valve seat for closure of the fluid aperture;
   a pair of elongate lever arms defining a longitudinal axis, each of the lever arms having a first end and an opposite second end, the first end of each lever arm being connected to the valve head, the lever arms being offset from the valve head, the lever arms being rotatable about a pivot axis located between the first ends and the second ends, the lever arms being symmetrically laterally spaced apart on opposite sides of the fluid flow axis to define an elongate space therebetween, the pivot axis being located in said space and said space extending on both longitudinal sides of the pivot axis; and
   an elongate tension spring having one end anchored to a first anchor point located between the second ends of the lever arms and an opposite end anchored to a second anchor point on the valve body, the elongate tension spring being configured to:
      (i) urge the valve head into contact with the valve seat on closure of the valve head, and
      (ii) provide a decreased opening force on opening of the valve head, wherein the first and second anchor points and the pivot axis, in combination with the angle of the valve seat, have a spatial arrangement that causes an acute angle made between a longitudinal axis of the spring and a longitudinal axis of the lever arms to decrease to less than 10 degrees when the valve head is fully opened, and
   wherein at least a portion of the spring is accommodated in the elongate space between the lever arms when the valve head is fully opened, said at least a portion of the spring extending on both longitudinal sides of the pivot axis.

2. The valve of claim 1, wherein the fluid aperture is in transverse section shaped oval or elongate.

3. The valve of claim 1, wherein the valve head is symmetrical and the spring is a single spring only located centrally of the valve head and aligned with a longitudinal axis of the valve body.

4. The valve of claim 1, wherein the acute angle made between the longitudinal axis of the spring and the longitudinal axis of the lever arms decreases to less than 5 degrees when the valve head is fully opened.

5. The valve of claim 1, wherein the tension spring rotates about a fixed transverse axis of the valve body through at least 10 degrees as the valve head moves from its closed to opened positions.

6. The valve of claim 1, wherein the tension spring elongation increases by less than 7 percent as the valve head moves from its closed to its opened positions.

7. The valve of claim 1, wherein the valve head includes a peripheral edge portion which is shaped substantially oval or elongate.

8. The valve of claim 7, which includes a resilient seal fitted adjacent the peripheral edge portion for sealing contact with the valve seat.

9. The valve of claim 8, wherein the resilient seal is in the form of a lip seal configured to resiliently deform to promote sealing of the valve head on its closure.

10. The valve of claim 1, wherein the valve seat is formed integral with the valve body.

11. The valve of claim 1, wherein the valve body defines an inlet fluid passageway on an upstream side of the fluid aperture, said passageway having an internal wall defining a tapered lead-in to the fluid aperture.

12. The valve of claim 11, wherein the internal wall is adjacent and encloses the pivot of the lever arms.

13. The valve of claim 11, wherein the internal wall on a downstream side of the fluid aperture defines a cavity into which the lever arms are at least in part received on opening of the valve head.

14. The valve of claim 1, wherein the tension spring is pre-tensioned to provide a minimum differential fluid pressure on opening of the valve head.

15. The Valve of claim 1, wherein the tension spring is configured relative to the lever arms so that the rate of change of the spring elongation decreases on increased opening of the valve head.

16. A valve comprising:
a valve body defining a transverse cross section having an ovular shape, the valve body including a valve seat defining a fluid aperture and inclined at an angle from 5 to 35 degrees relative to the cross section of the valve body taken at 90 degrees relative to a fluid flow axis through the valve body;
a valve head for contact with the valve seat for closure of the fluid aperture, wherein the valve head includes a peripheral edge portion which is shaped substantially ovular;
a resilient seal fitted to either of the peripheral edge portion of the valve head or the valve seat, the resilient seal configured to deform during contact of the valve head and the valve seat to promote sealing of the valve head upon closure;
a pair of elongate lever arms defining a longitudinal axis, each of the lever arms having a first end and an opposite second end, the first end of each lever arm being connected to the valve head, the lever arms being offset from the valve head, the lever arms being mounted on and rotatable about a pivot located between the first ends and the second ends, the lever arms being symmetrically laterally spaced apart on opposite sides of the fluid flow axis to define an elongate space therebetween, the pivot being located in said space and said space extending on both longitudinal sides of the pivot; and
a single elongate tension spring having one end anchored to a first anchor point located between the second ends of the lever arms and an opposite end anchored to a second anchor point on the valve body, the elongate tension spring being aligned with a fixed transverse axis of the valve body, the single elongate tension spring configured to:
(i) urge the valve head into contact with the valve seat on closure of the valve head, and
(ii) provide a decreased opening force on opening of the valve head, wherein the first and second anchor points and the pivot, in combination with the angle of the valve seat, have a spatial arrangement that causes an acute angle made between a longitudinal axis of the spring and a longitudinal axis of the lever arms to decrease to less than 10 degrees when the valve head is fully opened and wherein the tension spring rotates about the fixed transverse axis of the valve body through at least 10 degrees as the valve head moves from its closed to opened positions, and
wherein at least a portion of the spring is accommodated in the elongate space between the lever arms when the valve head is fully opened, said at least a portion of the spring extending on both longitudinal sides of the pivot.

17. The valve of claim 16, wherein the tension spring rotates about the fixed transverse axis of the valve body through about 10 to 20 degrees as the valve head moves from its closed to open positions.

18. The valve of claim 16, wherein the tension spring rotates about the fixed transverse axis of the valve body through about 12 to 15 degrees as the valve head moves from its closed to open positions.

* * * * *